P. A. LARSEN.
SLIDE EQUALIZER DOUBLETREE.
APPLICATION FILED MAY 4, 1911.
1,028,746.
Patented June 4, 1912.
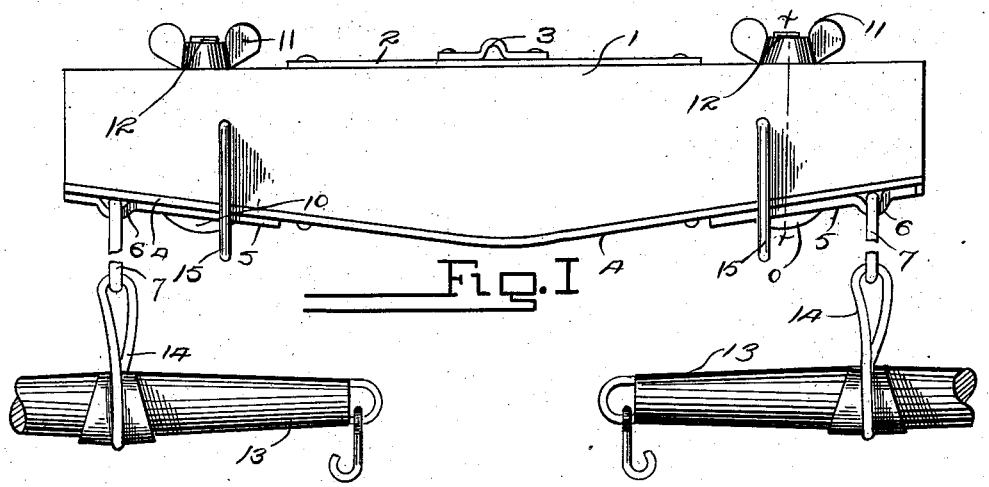
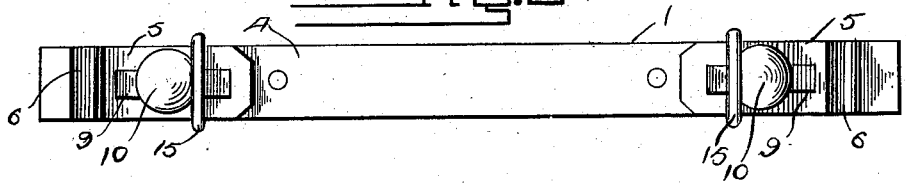
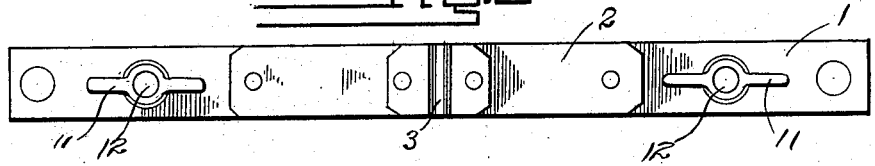
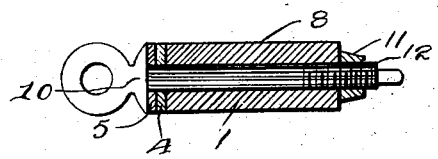
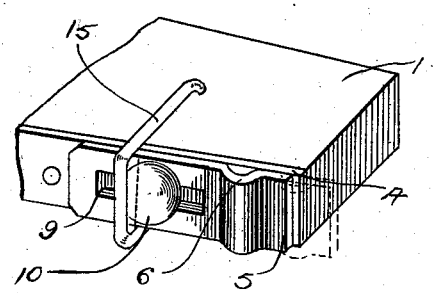
Inventor
Peter A. Larsen

UNITED STATES PATENT OFFICE.

PETER A. LARSEN, OF MOUNT PLEASANT, UTAH.

SLIDE-EQUALIZER DOUBLETREE.

1,028,746.  Specification of Letters Patent.  Patented June 4, 1912.

Application filed May 4, 1911. Serial No. 624,984.

*To all whom it may concern:*

Be it known that I, PETER A. LARSEN, a citizen of the United States, residing at Mount Pleasant, in the county of Sanpete and State of Utah, have invented certain new and useful Improvements in Slide-Equalizer Doubletrees, of which the following is a specification, reference being had therein to the accompanying drawing.

This invention relates to double tree eveners and has for its object to provide an improved device of this kind by means of which the swingle trees may be readily adjusted to equalize the draft, the arrangement being also such that the swingle trees may be readily detached from the double tree.

The invention consists of an improved double tree evener constructed and arranged as hereinafter set forth and claimed.

Referring to the accompanying drawing, Figure 1 is a plan view of a double tree evener constructed in accordance with this invention. Fig. 2 is a front view thereof. Fig. 3 is a rear view thereof. Fig. 4 is a cross section thereof on the line X—X of Fig. 1. Fig. 5 is an enlarged detail view in perspective of one end of the double tree with the improvement attached. Fig. 6 is a detail view in perspective of one end of the doubletree, showing a modification of the sliding plate employed therewith.

In the accompanying drawings 1 indicates a draft bar having secured to its rear edge a longitudinal strip of metal 2 to which in turn is secured a metal loop 3 for the attachment of the draft bar. The front edge of the draft bar is protected by a strip of sheet metal 4 secured thereto in any suitable manner and mounted upon each end of the draft bar 1 and slidable longitudinally on the sheet metal strip is a short metallic strip 5 formed with a loop 6 for the engagement of the end of a link 7. The metallic strip 5 is held in place by a bolt 8 extending through the draft bar 1, and the metallic strip 4 and through a slot 9 in the metallic strip 5 and having a head 10 at one end which extends over the slot 9 and a wing nut 11 engaging the other screw threaded end 12 of the bolt 8 and serving to tighten the head 10 of the bolt against the plate 5. It will be seen that by means of this construction by loosening the bolt 8 the metallic plate 5 may be slid longitudinally on the plate 4, and over the bolt 8 and held in any adjusted position by clamping the wing nut 11. A pair of swingle trees 13 are shown each being connected by a link 14 with the link 7. Hinged to the draft bar 1 adjacent to each end is a link 15 which straddles the front edge of the draft bar and extends over the plate 5, and is adapted to serve as a keeper for the plate 5 when the latter is loosened.

It will be seen that by means of the adjustable sliding plates 5 one at each end of the draft bar 1, the swingle trees may be adjusted toward or away from the ends of the draft bar. By this means owing to the unevenness of the ground or the difference in pull between the draft horses the draft may be equalized. It will also be seen that by means of the plates 5 and the bolts 8, that the wing nuts 11 with the swingle trees may be readily detached from the draft bar by detaching the plate 5, and in case of the breakage of the links a new one may be replaced.

In Fig. 6 is shown a modification of the sliding plate 5 and the plate 4, each of said plates being corrugated transversely so as to be securely held thereby in adjusted position. If desired the bolt 8 may be so located as to have its head 10 on the rear side of the doubletree and the wing nut 11 on the end of the bolt outside of the sliding plate 5.

Having described the invention, I claim:

In a device of the kind described, a draft bar, a metallic plate provided with a longitudinally extending slot having an open ended loop formed adjacent its outer end, said plate being positioned at one end of said draft bar, and a securing bolt and nut passing through the draft bar and slot in the plate, said bolt being positioned adjacent the end of the draft bar and the slot being of such length that the plate may be moved to bring the loop past the end of the draft bar whereby the open end of said loop may be uncovered.

In testimony whereof I hereunto affix my signature in presence of two witnesses.

PETER A. LARSEN.

Witnesses:
 ANDREW MARX,
 LAURITZ LARSEN.

Copies of this patent may be obtained for five cents each, by addressing the "Commissioner of Patents, Washington, D. C."